United States Patent
McSherry et al.

(10) Patent No.: US 6,676,350 B1
(45) Date of Patent: Jan. 13, 2004

(54) THREADED CEILING HOOK WITH ANTI ROTATION WASHER

(75) Inventors: Thomas W. McSherry, deceased, late of Sinking Spring, PA (US), by Frederick M. Nice, legal representative; Pierre R. McDuff, Outremont (CA); Lang Nguyen-Huu, Dollard-des-Ormeaux (CA); André Bouchard, Montreal (CA); Michel Villagrasa, St-Hubert (CA)

(73) Assignee: Cobra Anchors Co. Ltd (CA)

( * ) Notice: Subject to any disclaimer, the term of this patent is extended or adjusted under 35 U.S.C. 154(b) by 0 days.

(21) Appl. No.: 10/089,347

(22) PCT Filed: Sep. 27, 2000

(86) PCT No.: PCT/CA00/01101

§ 371 (c)(1),
(2), (4) Date: Sep. 11, 2002

(87) PCT Pub. No.: WO01/23767

PCT Pub. Date: Apr. 5, 2001

(30) Foreign Application Priority Data

Sep. 27, 1999 (CA) ............................................. 2283606

(51) Int. Cl.[7] ............................ F16B 39/00; F16B 39/24
(52) U.S. Cl. ....................... 411/135; 411/165; 411/368; 411/533
(58) Field of Search ................................. 411/160, 161, 411/162, 163, 164, 165, 368, 533, 134, 135, 136

(56) References Cited

U.S. PATENT DOCUMENTS

| | | | | |
|---|---|---|---|---|
| 3,352,344 | A | * 11/1967 | Lanius, Jr. | 411/165 X |
| 3,385,341 | A | * 5/1968 | Garstkiewicz | 411/165 X |
| 3,395,743 | A | 8/1968 | Black | |
| 4,034,788 | A | * 7/1977 | Melone | 411/165 X |
| 5,139,379 | A | 8/1992 | Hasan et al. | |
| 5,267,423 | A | 12/1993 | Giannuzzi | |

* cited by examiner

Primary Examiner—Neill Wilson
(74) Attorney, Agent, or Firm—Akerman Senterfitt

(57) ABSTRACT

A ceiling hook (H) comprises a fastener (F) for anchoring in a support structure, and a locking ring in the form of an anti-rotation washer (W). The washer (W) includes anchoring teeth (34) for stationarily mounting the washer (W) to the ceiling. The hook member (12) and the washer (W) comprise co-operating locking ratchet elements (22, 28) for locking the fastener (F) to the washer (W) and thus preventing the fastener (F) from loosening from the ceiling. The washer (W) defines at a central opening (30) thereof at least one notch (32) with the fastener (F) defining at least one tab with (26), the notch (32) being slidable through the tab (26) for mounting the washer (W) to the fastener (F) and then allowing it to rotate between the tab (26) and the book member (12), whereby the washer (W) is prevented from being removed from the fastener (F) unless the tab (26) and notch (32) are aligned.

14 Claims, 4 Drawing Sheets

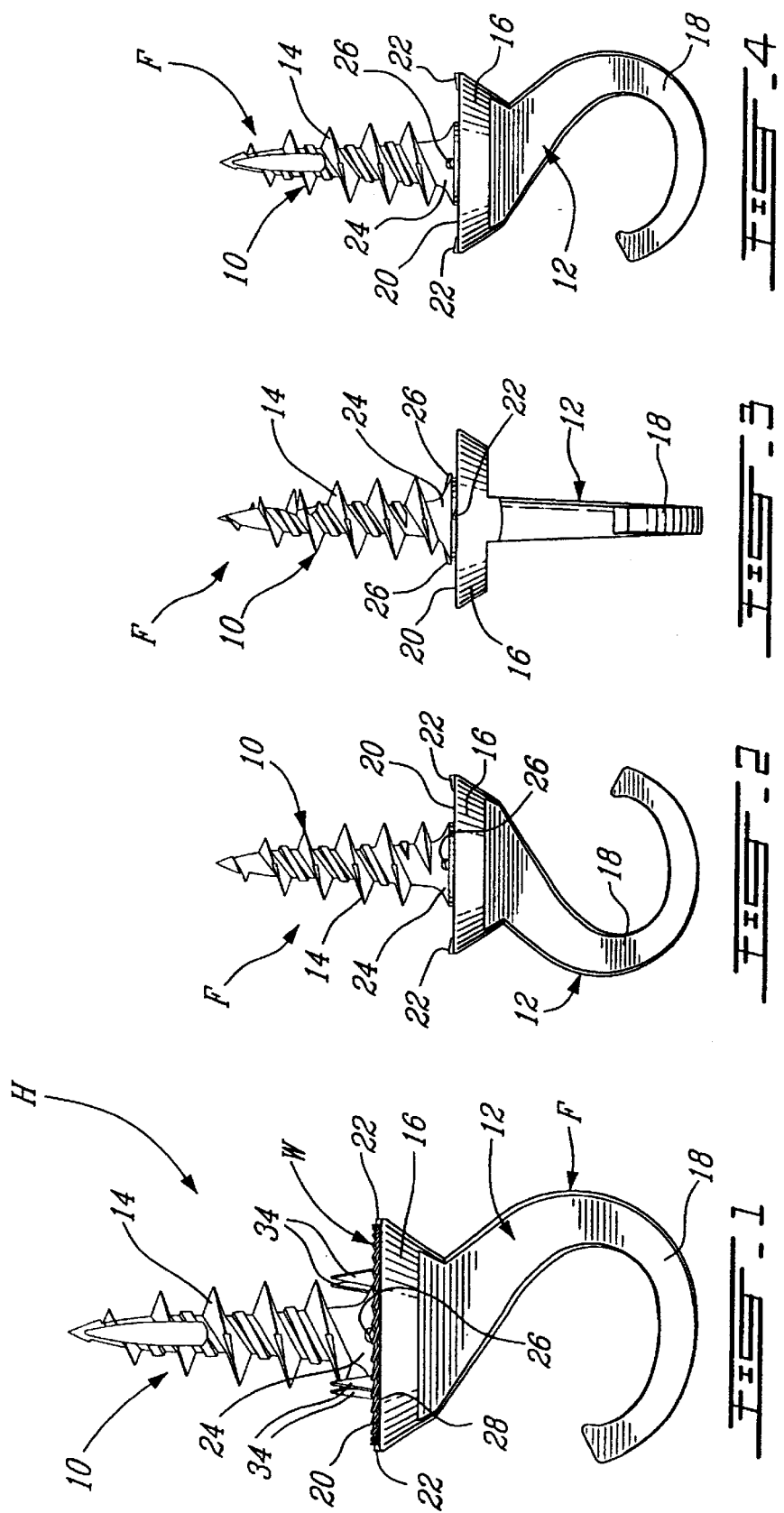

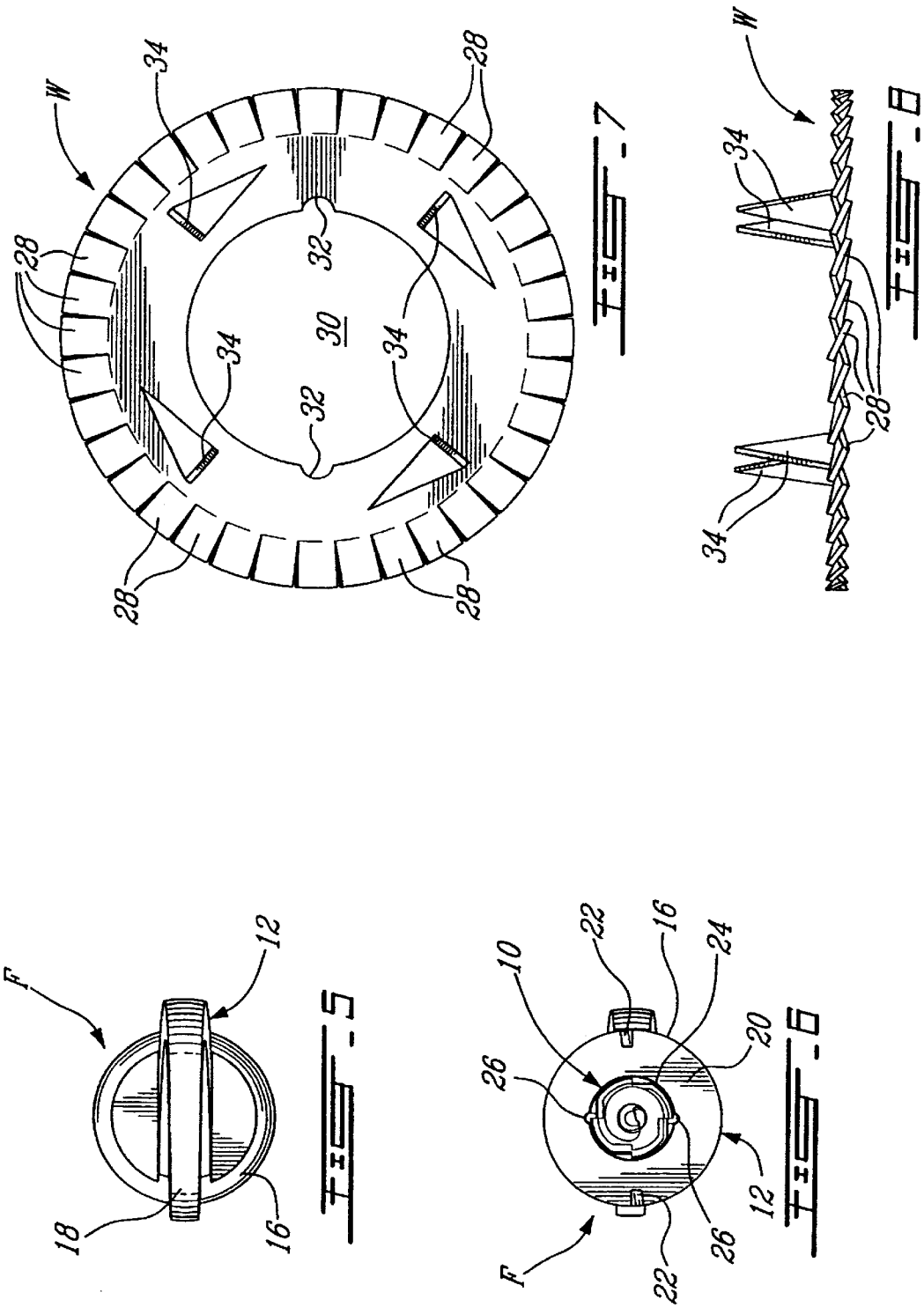

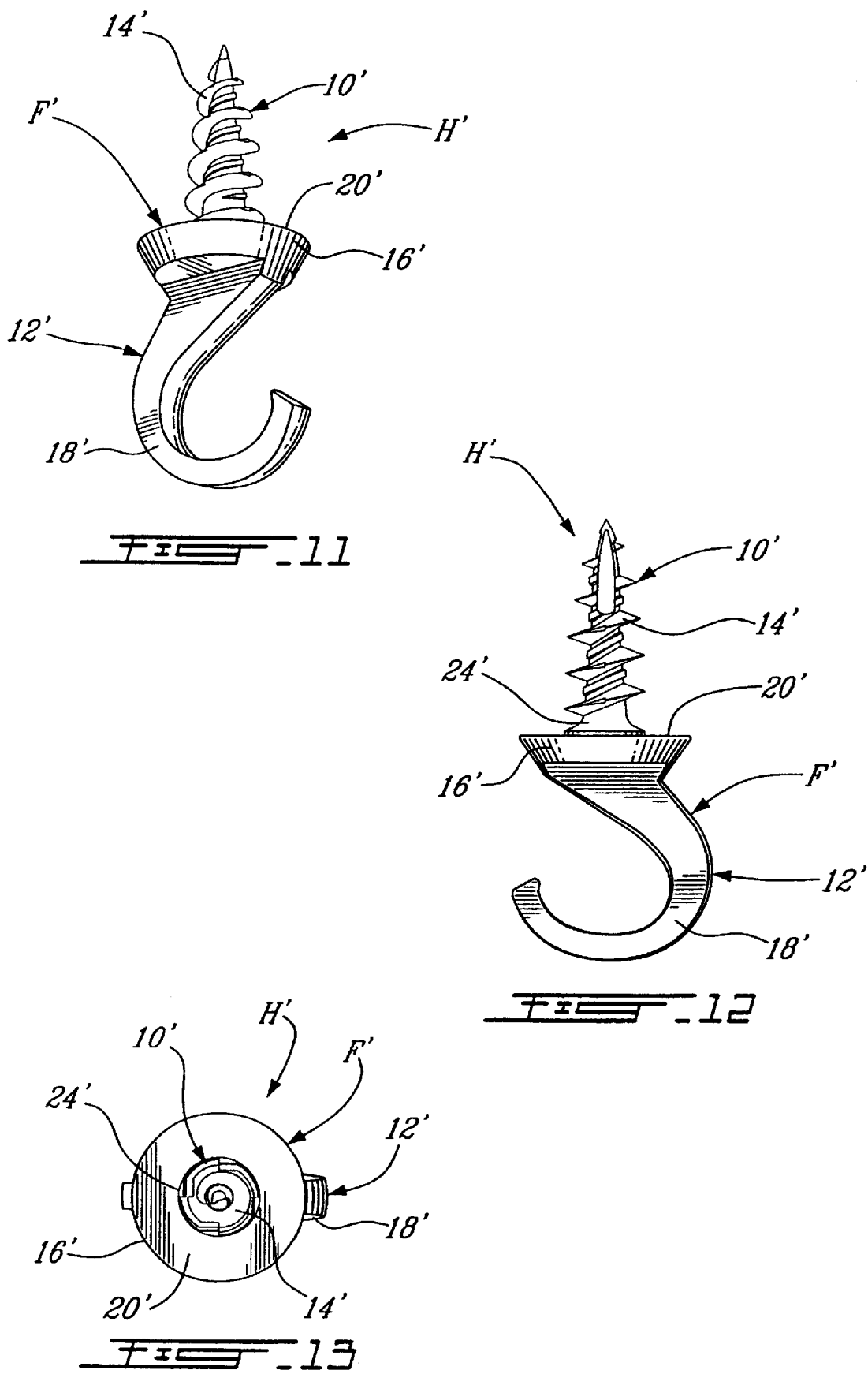

THREADED CEILING HOOK WITH ANTI ROTATION WASHER

BACKGROUND OF THE INVENTION

1. Field of the Invention

The present invention relates to anchors and, more particularly, to threaded anchors adapted to be secured to walls and ceilings for attaching an object thereto.

2. Description of the Prior Art

There exist various types of fasteners which are adapted to be engaged in walls or ceilings, for instance in boards made of gypsum which generally constitute these walls and ceilings. Such fasteners may be used to mount various articles, such as picture frames, brackets, to walls or may be used, for instance, in the form of hooks which are engaged in ceilings for suspending articles therefrom, such as plant hangers. Particularly in the case of fasteners secured to ceilings for suspending items therefrom, it often happens that the items, such as hanging plants, rotate about a generally vertical axis, for instance when a plant is manually rotated in order to water it from different sides. In these cases, the attachment of the hanging article to the fastener which often takes the form of a hook, may force the fastener to rotate with respect to the ceiling along a direction which gradually loosens, i.e. unscrews, the fastener which ultimately can disengage from the ceiling under the weight of the suspended article and this may result in damaged articles, messes and even injury.

SUMMARY OF THE INVENTION

It is therefore an aim of the present invention to provide a new anchor adapted to be rotatably fastened to walls and ceilings and which includes a locking mechanism for preventing an easy unintended rotation thereof with respect to the walls or ceilings.

It is also an aim of the present invention to provide a new anchor in the form of a hook especially adapted for rotatable engagement thereof by way of a threaded screw-like portion of the anchor to a ceiling for suspending articles therefrom.

Therefore, in accordance with the present invention, there is provided a fastener for anchoring in a support structure in combination with a locking unit for substantially preventing the fastener from accidentally loosening from the support structure, comprising a first member adapted to be inserted in the support structure for firmly anchoring said fastener thereto and also comprising a second member adapted to be located externally of the support structure, said locking unit including anchoring means for stationarily mounting said locking unit to the support structure, said second member and said locking unit comprising co-operating locking elements for locking said fastener to said locking unit and thus preventing said fastener from loosening from the support structure.

Also in accordance with the present invention, there is provided a method for securing a fastener to a support structure and substantially preventing the fastener from accidentally loosening from the support structure, comprising providing a fastener adapted to be partly inserted in the support structure for firmly anchoring the fastener thereto; providing a locking unit and stationarily mounting said locking unit to the support structure; and providing means for locking said fastener to said locking unit for preventing said fastener from accidentally loosening from the support structure.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a side elevational view of an anchor in accordance with the present invention shown in the form of a ceiling hook;

FIG. 2 is a side elevational view of a fastener of the ceiling hook of FIG. 1;

FIG. 3 is an end elevational view of the fastener of FIG. 2;

FIG. 4 is a side elevational view of the fastener of FIG. 2 but shown from an opposite side thereof;

FIG. 5 is a bottom plan view of the ceiling hook of FIG. 4;

FIG. 6 is a top plan view of the ceiling hook of FIG. 4;

FIG. 7 is a top plan view of an anti-rotation washer of the ceiling hook of FIG. 1;

FIG. 8 is an elevational view of the washer of FIG. 7;

FIG. 11 a perspective view of another anchor in accordance with the present invention, also shown in the form of a ceiling hook;

FIG. 12 is a side elevational view of the anchor of FIG. 11; and

FIG. 13 is a top plan view of the anchor of FIG. 11.

DESCRIPTION OF THE PREFERRED EMBODIMENTS

Figure 9:
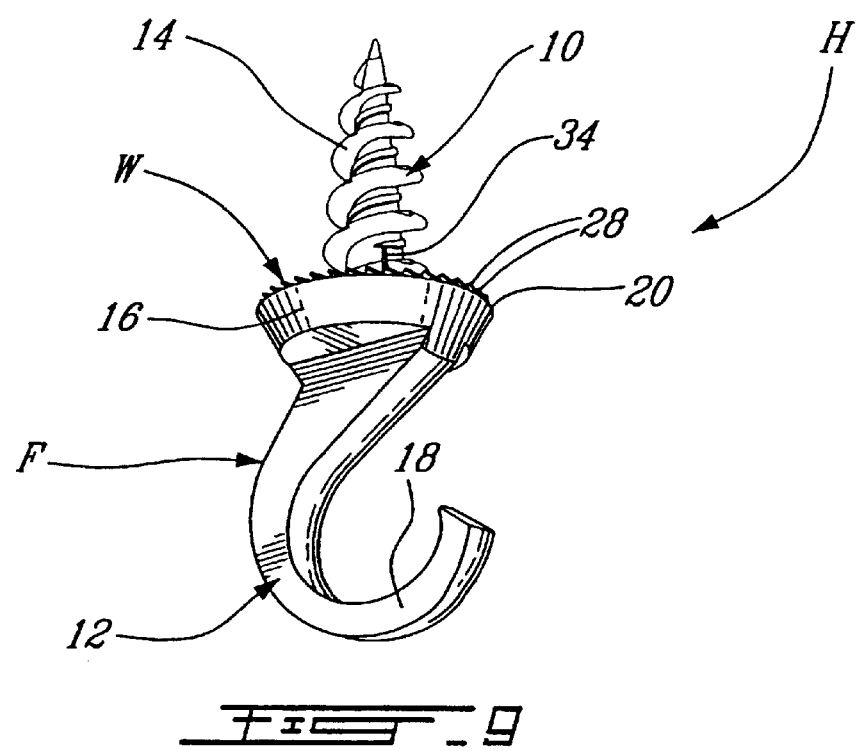
FIG. 9 is a perspective view of the anchor of FIG. 1.
Figure 10:
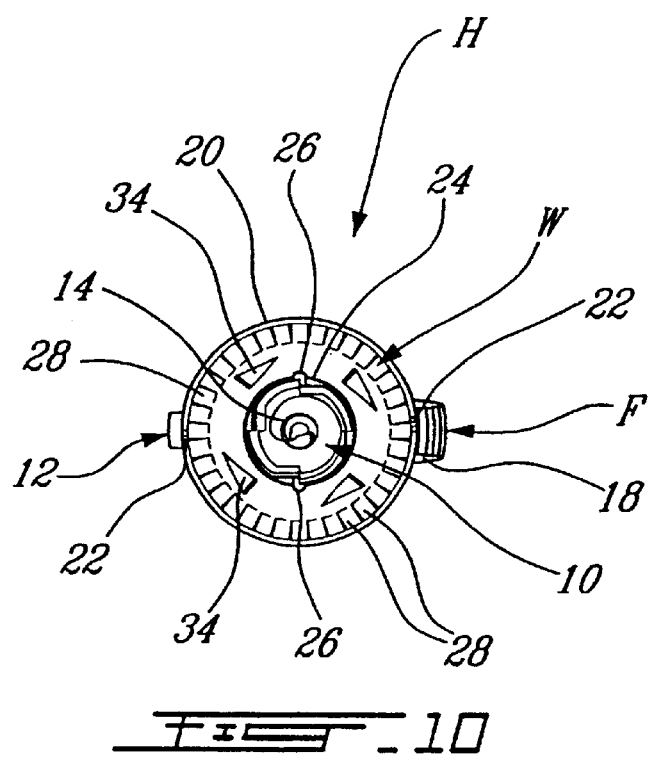
FIG. 10 a top plan view of the anchor of FIG. 1.

In accordance with the present invention, FIGS. 1, 9 and 10 illustrate a ceiling hook H which includes two components, namely a threaded fastener F and an anti-rotation washer W which are respectively illustrated in detail in FIGS. 2 to 6 and 7 and 8.

Now referring to FIGS. 2 to 6, the threaded fastener F comprises a threaded member 10 in the form of a screw and a hook member 12 securely mounted to the threaded member 10. The threaded member 10 includes threads 14 which are particularly adapted for secure anchoring in gypsum boards which are typically found in the constructions of walls and ceiling. Obviously, the threads 14 may be differently configured such as to comply receiving materials other than gypsum. The hook member 12 includes an upper disc-like member 16 and an integral hook 18 extending downwardly therefrom. The disc member 16 includes an upper surface 20 with a pair of diametrically opposed ratchet teeth 22 extending upwardly therefrom, as best seen in FIGS. 2, 3 and 6.

The threaded member 10 includes a lower circular head 24 which is provided with a pair of diametrically opposed, radially extending, elongated tabs 26 which are slightly spaced apart from the upper surface 20 of the disc member 16 of the hook member 12, as best seen in FIG. 3.

Now turning to FIGS. 7 and 8, the anti-rotation washer has a generally annular shape with a series of successively arranged ratchet tongues 28 being provided along the outer periphery thereof. The washer W defines a central opening 30 which is generally circular in shape except for a pair of diametrically opposed notches 32. Between the central opening 30 and the ratchet tongues 28, the washer W defines a number of upwardly extending anchoring teeth 34 of pointed configuration and which are, in the illustrated embodiment, in the number of four (4) equally distributed along the washer W and have been defined by stamping cutting the washer W and folding the teeth 34 until they extend substantially perpendicularly to the general plane of the washer W.

To assemble the washer W to the threaded fastener F, the threaded member 10 of the fastener F is inserted through the central opening 30 of the washer w such that the pointed anchoring teeth 34 of the washer W extend in a same direction as the threaded member 10. The washer W is brought into contacting engagement with the upper surface 20 of the fastener F by aligning the notches 32 of the washer W with the tabs 26 of the head 24 of the threaded member 10. If such an alignment is not made, the washer will be prevented from reaching the upper surface 20 by the tabs 26.

Then, the washer W is rotated clockwise (when viewed from above in FIG. 1) relative to the fastener F to cause a disalignment between the tabs 26 and the notches 32 thereby preventing disengagement of the washer W from the fastener F. It is understood that the thickness of the washer W inwardly of the anchoring teeth 34 thereof is less than the spacing between the tabs 26 and the upper surface 20; indeed, this is required in order to allow the washer W to be below the tabs 26 when the washer W rests on the upper surface 20 thereby allowing the washer W to be rotated with respect to the fastener F.

When the washer W is rotated along the upper surface 20 and below the tabs 26, its ratchet tongues 28 ride along the ratchet teeth 22 provided on the upper surface 20.

Once the washer W is properly mounted to the fastener F as described hereinabove, the ceiling hook H is ready to use. To install the ceiling hook H in a supporting structure such as a gypsum board of a ceiling, the ceiling hook H is held by the hook member 12 and the pointed end of the fastener F is slightly translationally inserted in the gypsum of the ceiling and the hook H is then rotated about an axis of the threaded member 12 such that the threads 14 engage the ceiling in a conventional manner. The hook H must be rotated until the washer W contacts the visible surface of the ceiling.

Before the ratchet tongues 28 reach the ceiling, the pointed raised anchoring teeth 34 of the washer W perforate the gypsum ceiling and become engaged therein, whereby any subsequent rotation of the fastener F is effected without the washer W following; in other words, once the anchoring teeth 34 of the washer W have engaged the ceiling, the washer W cannot rotate and can only translationally displace towards the ceiling as being forced in that direction by the disc member 16 upon further rotation of the fastener F. Once the anchoring teeth 34 have so engaged the ceiling and the fastener F has been further rotated up to its ratchet teeth 22 contacting the ratchet tongues 28 of the washer W, the continued rotation of the fastener F is done with the ratchet teeth 22 riding along the underside of the ratchet tongues 28 of the washer W until the fastener F cannot be further rotated which occurs when the upper surface 20 is in firm abutting engagement with the washer W which itself bears firmly against the visible surface of the ceiling.

In this position, it is readily understood that the fastener F cannot loosen with respect to the ceiling, i.e. it cannot rotate counterclockwise, as it is prevented from counter rotating by the locked engagement of the ratchet teeth 22 of the fastener F with the ratchet tongues 28 of the washer W in concert with the fact that the washer W is itself stationary as being anchored to the ceiling in view of its anchoring teeth 34 being engaged in the ceiling.

It is noted that a pair of ratchet teeth 22 are preferably provided on the fastener F in order to ensure that, in the event that the fastener F is inserted in the ceiling in a slightly crooked way (i.e. the axis of the threaded member 10 is not perpendicular to the receiving surface of the ceiling), at least one ratchet teeth 22 lockably is engaged to the ratchet tongues 28 of the washer W. In other words, if for one reason or another, one of the ratchet teeth 22 can rotate freely, i.e. away from the ratchet tongues 28 of the washer W, the other ratchet teeth 22 will engage in ratchet fashion these tongues 28 and ensure that the fastener F is rotatably locked to the washer W such as to prevent the fastener F from counter rotating with respect thereto thereby preventing the fastener F from loosening from the ceiling.

Therefore, the ceiling hook H of the present invention is prevented from accidentally loosening due to gradual rotation of the article suspended therefrom which may be done to, for instance, water a plant so suspended, or even due to manual rotations of the hook for adjusting the orientation thereof.

As an alternative to the above-described and herein illustrated embodiment, the anti-rotation locking washer W, or a similar unit), could be directly installed in the ceiling rather than being first assembled to the fastener F, for instance by pressing the washer manually towards the ceiling such as to drive the anchoring teeth 34 into the ceiling's gypsum board; then the fastener F may be positioned in the central opening 30 of the washer W and subsequently rotatably inserted in the ceiling. Once the disc member 16 is close enough to the ceiling and thus to the washer W, its ratchet teeth 24 will engage the ratchet tongues 28 of the washer W and ride therealong until the fastener F tightly imprisons the washer W against the ceiling at which point, as described hereinabove, the fastener F is prevented from loosening by the locking engagement of its ratchet teeth 22 with the ratchet tongues 28 of the washer W which itself is held stationary by being secured to the ceiling by its anchoring teeth 34.

In such a case where the washer W is mounted manually to the ceiling, that is without using the fastener F, the washer W could be made without its notches 32 and the fastener F could be exempt of its tabs 26. The central opening 30 could also be provided with a guide to align, i.e. concentrically position, the washer W with the location on the ceiling at which the fastener F will be subsequently inserted; such a guide could take the form of a yieldable transparent sheet extending across the opening 30 and defining a pair of orthogonal sighting lines intersecting at the center of the washer such that the center of the washer could be positioned at the intended location of the fastener.

FIGS. 11 to 13 show a variant ceiling hook H' which is similar to the ceiling hook H of FIGS. 1 and 9 except that it does not include the anti-rotation washer W thereof. The ceiling hook H' thus includes a unitary component, namely a threaded fastener F'.

The threaded fastener F' is similar to the threaded fastener F of FIGS. 1 and 9, except that it does not include the ratchet teeth 22 and the tabs 26 thereof as they are not necessary to the ceiling hook H' as they are only functional when the fastener of the present invention is used with the anti-rotation washer W, or the like.

What is claimed is:

1. A fastener for anchoring in a support structure in combination with a locking unit for substantially preventing the fastener from accidentally loosening from the support structure, the fastener comprising:

a first member adapted to be inserted in the support structure for firmly anchoring said fastener thereto; and a second member adapted to be located externally of the support structure;

wherein said locking unit is mounted to said fastener and includes at least one anchoring element for stationanly engaging said locking unit to the support structure; and wherein said second member and said locking unit comprise co-operating locking elements for locking said fastener to said locking unit and thus prevent said fastener from accidentally loosening from the support structure.

2. The combination of claim 1, wherein said locking unit comprises a locking ring having anchoring teeth adapted to extend into the support structure, said locking ring being mounted to said fastener such as to be sandwiched between said second member and the structure when said fastener is firmly secured thereto.

3. The combination of claim 1, wherein said co-operating locking elements comprise at least one first ratchet tooth provided on one of said second member and said locking unit and a series of second ratchet teeth provided on the other of said second member and said locking unit.

4. The combination of claim 3, wherein said second member comprises a pair of diametrically opposed first ratchet teeth for co-operating with said series of second ratchet teeth provided on said locking unit such that said second ratchet teeth ride along said first ratchet teeth upon rotation of said fastener and with said locking unit being anchored to the support structure.

5. The combination of claim 2, wherein said locking ring defines at a central opening thereof at least one notch, said fastener defining at least one tab with said notch being slidable through said tab for mounting said locking ring to said fastener and between said tab and said second member thereof whereat said locking ring can rotate around said fastener, whereby said locking ring is prevented from being removed from said fastener unless said tab and said notch are aligned.

6. A fastener for anchoring in a support structure in combination with a locking unit for substantially preventing the fastener from accidentally loosening from the support structure, the fastener comprising:

an anchor member adapted to be inserted in the support structure for firmly anchoring said fastener thereto; and a hook adapted to be located externally of the support structure;

wherein said locking unit is mounted to said fastener and includes at least one anchoring element for stationarily engaging said locking unit to the support structure;

wherein locking elements are provided for locking said fastener to said locking unit and thus prevent said fastener from accidentally loosening from the support structure; and whereby said fastener, with said locking unit mounted thereto, can be installed in the support structure by hand.

7. The combination of claim 6, wherein said locking unit comprises a locking ring having anchoring teeth adapted to extend into the support structure, said locking ring being mounted to said fastener such as to be sandwiched between said hook and the structure when said fastener is firmly secured thereto.

8. The combination of claim 6, wherein said co-operating locking elements comprise at least one first ratchet tooth provided on one of said hook and said locking unit and a series of second ratchet teeth provided on the other of said hook and said locking unit.

9. The combination of claim 8, wherein said hook comprises a pair of diametrically opposed first ratchet teeth for co-operating with said series of second ratchet teeth provided on said locking unit such that said second ratchet teeth ride along said first ratchet teeth upon rotation of said fastener and with said locking unit being anchored to the support structure.

10. The combination of claim 7, wherein said locking ring defines at a central opening thereof at least one notch, said fastener defining at least one tab with said notch being slidable through said tab for mounting said locking ring to said fastener and between said tab and said hook thereof whereat said locking ring can rotate around said fastener, whereby said locking ring is prevented from being removed from said fastener unless said tab and said notch are aligned.

11. A fastener for anchoring in a support structure in combination with a locking unit for substantially preventing the fastener from accidentally loosening from the support structure, comprising:

a first member adapted to be inserted in the support structure for firmly anchoring said fastener thereto; and a second member adapted to be located externally of the support structure, said locking unit including at least one anchoring element for stationarily mounting said locking unit to the support structure, said second member and said locking unit comprising co-operating locking elements for locking said fastener to said locking unit and thus preventing said fastener from accidentally loosening from the support structure said locking unit comprising a locking ring having anchoring teeth adapted to extend into the support structure, said locking ring being adapted to be mounted to said fastener such as to be sandwiched between said second member and the structure when said fastener is firmly secured thereto, said locking ring defining at a central opening thereof at least one notch, said fastener defining at least one tab with said notch being slidable through said tab for mounting said locking ring to said fastener and between said tab and said second member thereof whereat said locking ring can rotate around said fastener; and whereby said locking ring is prevented from being removed from said fastener unless said tab and said notch are aligned.

12. The combination of claim 11, wherein said co-operating locking elements comprise at least one first ratchet tooth provided on one of said second member and said locking ring and a series of second ratchet teeth provided on the other of said second member and said locking ring.

13. The combination of claim 12, wherein said second member comprises a pair of diametrically opposed first ratchet teeth for cooperating with said series of second ratchet teeth provided on said locking ring such that said second ratchet teeth ride along said first ratchet teeth upon rotation of said fastener and with said locking ring being anchored to the support structure.

14. A method for securing a fastener to a support structure and substantially preventing the fastener from accidentally loosening from the support structure, comprising the steps of:

providing a fastener;

providing a locking unit;

mounting said locking unit to said fastener such that said locking unit can rotate about said fastener;

rotating said fastener with said locking unit mounted thereto, into the support structure such as to secure said fastener thereto, and causing said locking unit to fixedly engage the support structure; and further rotating said fastener at least until said fastener is locked to said locking unit in such a way as to prevent said fastener from loosening from the support structure.

* * * * *

UNITED STATES PATENT AND TRADEMARK OFFICE
CERTIFICATE OF CORRECTION

PATENT NO. : 6,676,350 B1
DATED : January 13, 2004
INVENTOR(S) : McSherry et al.

It is certified that error appears in the above-identified patent and that said Letters Patent is hereby corrected as shown below:

<u>Title page,</u>
Item [73], Assignee, replace "Cobra Anchors Co. Ltd" with -- Cobra Fixations Cie Ltee - Cobra Anchors Co. Ltd. --.

Signed and Sealed this

Nineteenth Day of October, 2004

JON W. DUDAS
*Director of the United States Patent and Trademark Office*